United States Patent [19]

Jones

[11] Patent Number: 5,286,951
[45] Date of Patent: Feb. 15, 1994

[54] ACETATE SPECTACLE FRAME BRIDGE ADJUSTER

[76] Inventor: Mark A. Jones, 73 Greenhill Ave., Hamilton, Canada, L8K 5C5

[21] Appl. No.: 973,495

[22] Filed: Nov. 9, 1992

[51] Int. Cl.⁵ .......................... H05B 3/06; B25B 1/00
[52] U.S. Cl. .................................. 219/521; 248/902; 81/3.5; 269/296; 165/104.16
[58] Field of Search ..................... 219/521, 200, 201; 248/902; 81/3.5; 269/289 R, 296; 165/104.15, 104.16

[56] References Cited

U.S. PATENT DOCUMENTS

| | | | |
|---|---|---|---|
| 1,541,375 | 6/1925 | Neuwirth et al. | 81/3.5 |
| 2,661,645 | 12/1953 | Heath | 81/3.5 |
| 2,710,331 | 6/1955 | Stegeman | 81/3.5 |
| 2,836,696 | 5/1958 | Ratchford | 126/273 R |
| 3,564,202 | 2/1971 | Oppenheim | 219/400 |
| 3,710,653 | 1/1973 | Miller | 81/3.5 |
| 3,816,705 | 6/1974 | Ebert | 219/553 |
| 4,054,376 | 10/1977 | Wareham | 81/3.5 |
| 4,758,285 | 7/1988 | Hodgson et al. | 148/11.5 R |
| 4,896,023 | 1/1990 | Uchiyama | 219/521 |
| 5,216,944 | 6/1993 | Trujillo | 219/521 |

*Primary Examiner*—Bruce A. Reynolds
*Assistant Examiner*—John A. Jeffery
*Attorney, Agent, or Firm*—Patrick J. Hofbauer

[57] ABSTRACT

A device for supporting a plastic spectacle frame in a plastic spectacle frame warmer of the type that, in use, retains a primary amount of a solid granular material such as glass beads, in a heating pan and that uses the glass beads as a heat transfer medium, is disclosed. The device comprises a base portion for maintaining the device in a substantially upright relation within the heating pan of the frame warmer. An intermediate portion is supported by the base portion and extends upwardly therefrom. A receptacle portion is supported by the intermediate portion and extends upwardly from the base portion, and is adapted to receive and retain a secondary amount of the glass beads therein above the level of primary amount of the glass beads in the heating pan. There is provided a bridge area receiving means, preferably a pair of opposed vertically displaced slots in the receptacle portion, which slots are adapted to hold the bridge area of the spectacles in supported contacting relation with the secondary amount of glass beads. The secondary amount of glass beads is poured into the interior of the receptacle portion after the plastic frame spectacles have been placed in the slots.

16 Claims, 2 Drawing Sheets

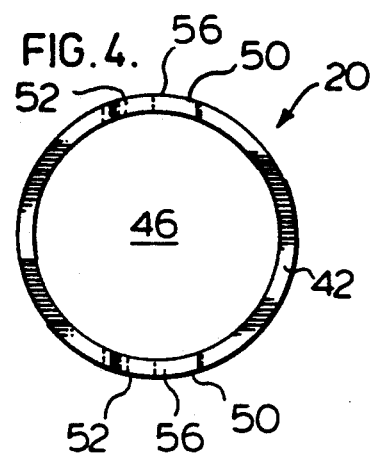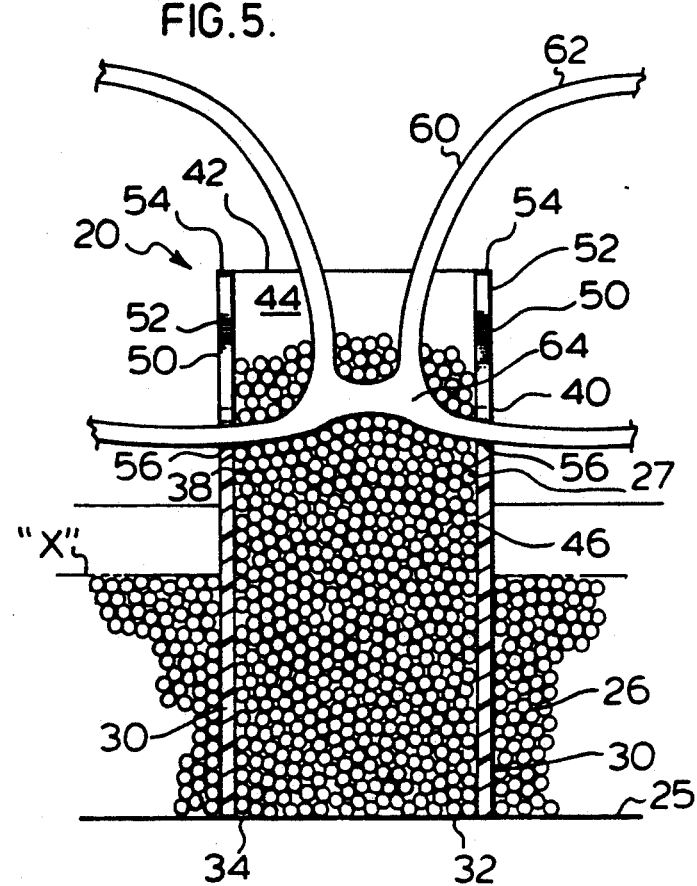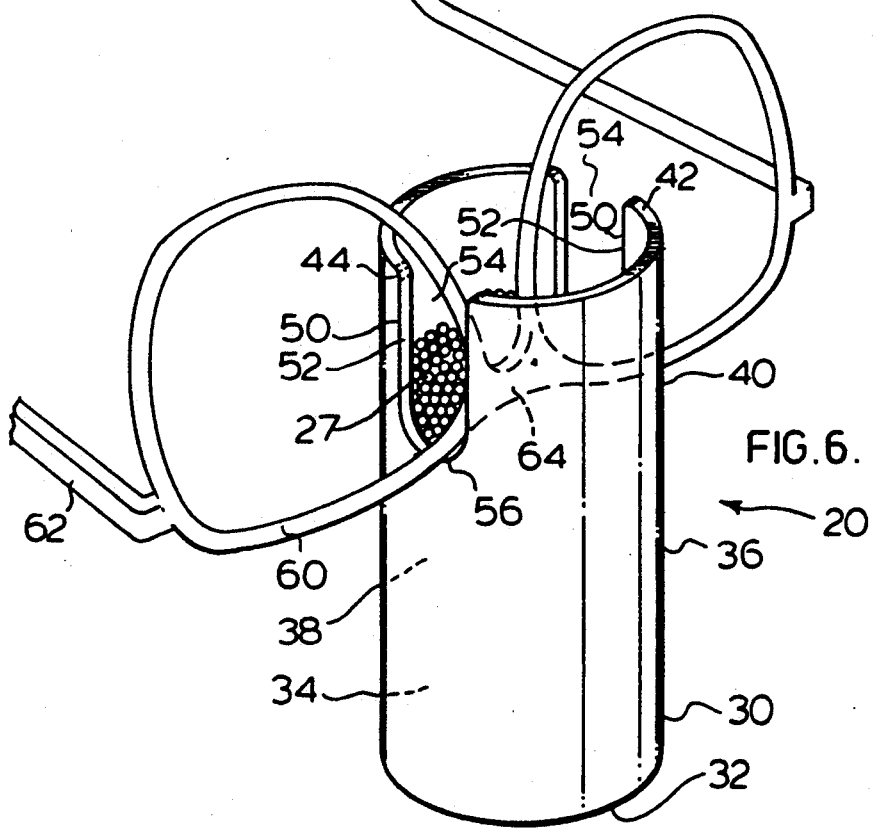

ACETATE SPECTACLE FRAME BRIDGE ADJUSTER

FIELD OF THE INVENTION

The present invention relates to spectacles and more particularly to devices used by opticians for the purpose of adjusting the shape of plastic spectacle frames.

BACKGROUND OF THE INVENTION

In order to make spectacles properly fit a wearer, the frame of each pair of spectacles must typically be individually adjusted by a dispensing optician. Such adjustment for proper fitting is typically required for new spectacles, and may also be required subsequently, if the spectacles goes out of shape.

Spectacles having a plastic frame, which plastic is typically acetate, are properly heated to a temperature of about 250° F. to about 350° F. in order to bend the frame for adjustment purposes. Failure to sufficiently heat the frame may result in the frame snapping during the adjustment process. Excess heating may cause the frame to excessively distort, may damage the spectacle lenses, particularly if plastic lenses, or may damage the finish of the spectacle frame or lenses. Accordingly, proper heating of a plastic spectacle frame is a delicate operation that must be accurately controlled.

One method of heating a plastic spectacle frame is to use hot air from a controlled temperature hot air blower. This method is unpopular for a variety of reasons, including the high cost of the specialized equipment and the risk of a person using the equipment, such as an optician, exposing his hands to the hot air. Further, this method does not readily allow for specific parts of a plastic spectacle frame to be targeted for localized heating.

Another method of heating a plastic spectacle frame includes the use of a frame warmer that retains an amount of solid granular material, such as glass beads. The glass beads are heated in the heating pan, commonly known as a salt pan, to a temperature of between about 250° F. and 350° F., which temperature is sufficient to make the plastic material of the plastic spectacle frame temporarily slightly pliable without actually melting the plastic material. In this manner, the plastic spectacle frame is pliable enough to be bent slightly to adjust the shape of the spectacle frame properly to a wearer's head. Once the spectacle frame has cooled, the frame retain this newly adjusted shape.

On occasion it is necessary to bend an spectacle frame only at the bridge area thereof in order to allow for relative angular adjustment of the lens portion of the spectacle frame. On such occasion, it is highly desirable that no other part of the spectacle frame be bent. In order to bend the plastic frame only at the bridge area thereof, it is necessary that the heating of the plastic frame be localized at the bridge area so as to preclude the chance of any other part of the spectacle frame from becoming warm and pliable, and thus easily bent. Such localized heating cannot be readily accomplished with either of the two common prior art methods of heating a plastic spectacle frame, as discussed above.

SUMMARY OF THE INVENTION

It is an object of the present invention to provide a means for permitting a plastic spectacle frame to be targeted for localized heating for subsequent corresponding localized bending adjustment.

It is a further object of the present invention to provide a means for permitting a plastic spectacle frame to be targeted for localized heating through the use of a frame warmer of the type that, in use, retains a base amount of a solid granular material in a heating pan and that uses said solid granular material as a heat transfer medium.

It is an object of the present invention to provide a means for permitting a plastic spectacle frame to be targeted for localized heating of the bridge area thereof, for subsequent corresponding localized bending adjustment.

In order to achieve the objects of this invention, there is disclosed a device for supporting a plastic spectacle frame, with or without the lenses in place therein, in a plastic spectacle frame warmer of the type that, in use, retains a primary amount of a solid granular material in a heating pan and that uses the solid granular material as a heat transfer medium. The device comprises a base portion for maintaining the device in substantially upright relation within the heating pan of the frame warmer; an intermediate portion supported by the base portion and extending substantially upwardly therefrom; a receptacle portion supported by the intermediate portion and extending substantially upwardly therefrom, and adapted to receive and retain a secondary amount of the solid granular material therein above the primary amount of the solid granular material; and a bridge receiving means associated with the receptacle portion and adapted to hold the bridge area of the spectacle frame above the primary amount of the solid granular material in supported contacting relation with the secondary amount of the solid granular material.

Other objects, features and characteristics of the present invention, as well as methods of operation and functions of the related elements of the structure, and the combination of parts and economies of manufacture, will become more apparent upon consideration of the following detailed description and the appended claims, with reference to the accompanying drawings, all of which form a part of this specification.

DETAILED DESCRIPTION OF A PREFERRED EMBODIMENT

Introduction to the Drawings

FIG. 1 of the drawings appended hereto is an isometric view of a plastic spectacle frame warmer of the type that uses an amount of solid granular material as a heat transfer medium, with the device of the present invention partially embedded in the solid granular material;

FIG. 2 of the drawings is an isometric view of the device shown in FIG. 1;

FIG. 4 is a top plan view of the device of FIG. 2;

Figure 1:
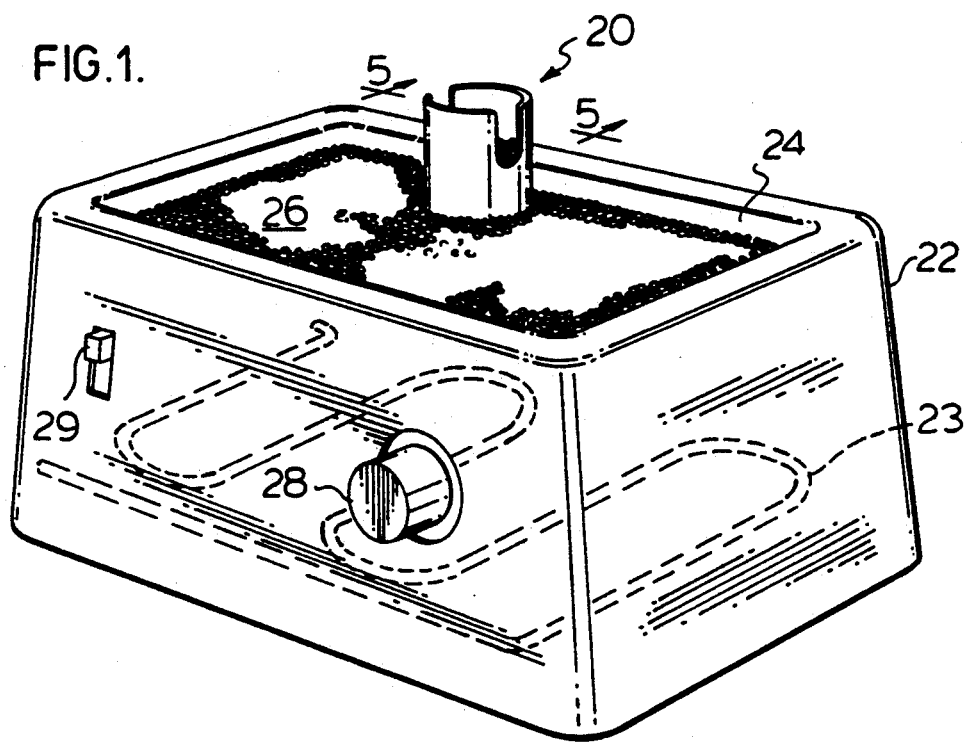

FIG. 5 is an enlarged partially cut-away sectional side view of the device and plastic spectacle frame warmer of FIG. 1, taken along section lines 5—5 of FIG. 1, with plastic frame spectacles being supported in an upside down configuration by the device; and, FIG. 6 is an isometric view of the device and plastic frame spectacles and device of FIG. 5, with the plastic spectacle frame warmer omitted for simplicity.

Referring now to FIG. 1 of the drawings, the device of the present invention, which is indicated by general reference numeral 20, is shown in use in conjunction with a conventional plastic spectacle frame warmer 22. The device 20 is maintained in the plastic spectacle frame warmer 22 by a primary amount of glass beads 26 within a heating pan 24. The heating pan 24 is contacted for conductive heating on its bottom surface by an electric heating element 23 (shown in phantom outline in FIG. 1) mounted within the frame warmer 22. The heating pan 24, in turn, electrically heats the glass beads, which are used to provide localized heating, when used in conjunction with the device 20 as will be described subsequently. The plastic spectacle frame warmer 22 has a heat adjust knob 28 for setting the desired temperature of the heating pan 24 and ultimately the primary amount of glass beads 26, and an on-off switch 29 for turning the frame warmer 22 on and off. The glass beads are basically a solid granular material that is used as a heat transfer medium to transfer heat from the heating pan 24 to a pair of plastic frame spectacles (not shown).

Figure 2:
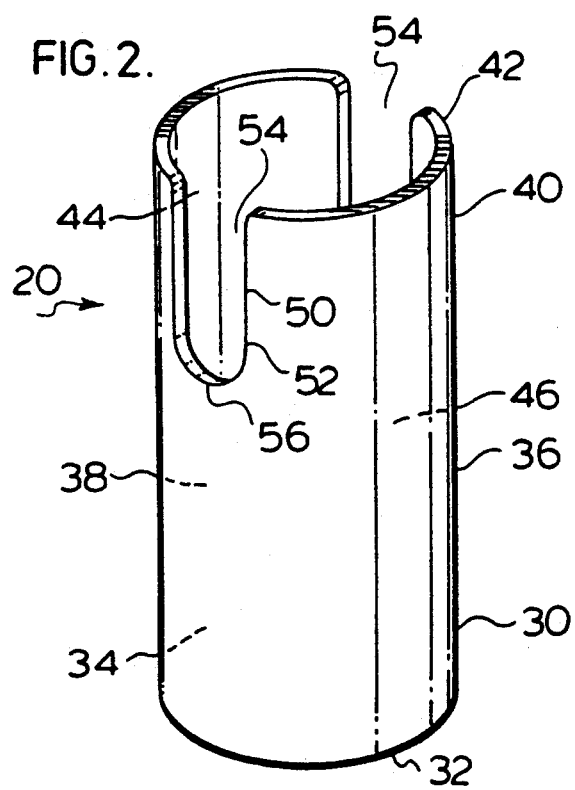
Figure 3:
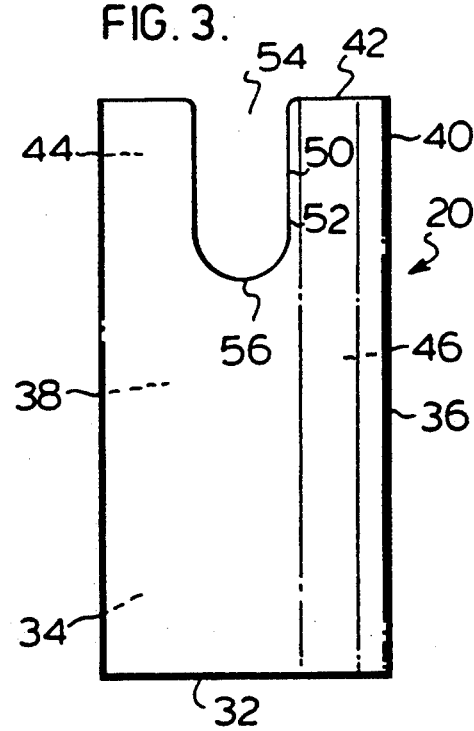
FIG. 3 is a side elevational view of the device of FIG. 2.

Reference will now be made to FIGS. 2 through 4, to describe the device 20 of the present invention in detail. The device 20 includes a base portion 30, an intermediate portion 36, and a receptacle portion 40. The base portion 30 is preferably of generally circular cross-section and is designed to maintain the device 20 in a substantially upright relation within the heating pan of the frame warmer 22. The bottom end 32 of the base portion 30 contacts and rests on the heating pan 24. The base portion is preferably a generally hollow structure comprising a third peripheral wall that substantially defines a hollow interior 34. The third peripheral wall is adapted to retain a portion of the primary amount of glass beads 26 therein as more fully described below.

The intermediate portion 36 extends substantially upwardly from the base portion 30, and is a generally hollow structure contiguous with the base portion and comprises a second peripheral wall, also of substantially circular cross-section that substantially defines a hollow interior 38. The second peripheral wall is adapted to laterally retain a portion of said solid granular material therein.

The receptacle portion 40 extends substantially upwardly from the intermediate portion 36, and terminates at a top end 42. The receptacle portion 40 is a generally hollow structure of substantially circular cross-section comprising a first peripheral wall that is contiguous with the intermediate portion 30 and which substantially defines a hollow interior 44. The first peripheral wall is adapted to laterally retain a secondary amount of glass beads 27 therein.

It can been seen that in the preferred embodiment the first, second and third peripheral walls are contiguous with one another so as to form one integral structure. Correspondingly, the hollow interior 34 of the base portion 30, the hollow interior 38 of the intermediate portion 36, and the hollow interior 44 of the receptacle portion 40 are contiguous with one another so as to form a unitary hollow interior 46 within the device 20. The device 20 is preferably open at the bottom end 32 of the base portion 30 and also at the top end 42 of the receptacle portion 40, so as to allow access to the unitary hollow interior 46, although it need only be open at the top end 42 to be operative.

Preferably, the device is made from a single piece of material, such as from a hollow tube of phenolic plastics material. For ease of manufacture, the device 20 is substantially cylindrical in cross-section and is about 1½" in diameter and about 3" high for use with adult plastic spectacle frames and about 1" in diameter and 3" high for use with childrens' spectacle frames.

There is provided a bridge receiving means 50 associated with the receptacle portion 40, which bridge receiving means 50 is comprised of a pair of vertically displaced notches 52,52 in the first peripheral wall of the receptacle portion 40. Each of the pair of notches 52 has a first end 54 that is open at the top end 42 of the receptacle portion 40 and a second end 56 located within the first peripheral wall of the receptacle portion 40. The second ends 56,56 of the notches 52 are substantially semi-circular in shape, but may be of any suitable shape. The bridge receiving means 50 is adapted to hold the bridge area of a pair of plastic frame spectacles as will be discussed subsequently in greater detail.

Preferably, the device is made of a heat insulative material to retain the heat from the heating medium being used. Materials such as plastic materials, especially phenolic plastics, are preferred because of their heat insulative properties. Further, phenolic plastic is readily available in tubing of appropriate diameter and wall thickness of appropriate diameter, for ease of manufacturing.

Reference will now be made to FIGS. 5 and 6, which show the device 20 of the present invention in use in the plastic spectacle frame warmer 22, and supporting the frame of the plastic frame spectacles 62. The device 20 is first set in the heating pan 24 of the plastic spectacle frame warmer 22 such that the bottom end 32 of the base portion 30 preferably rests directly on the floor 25 of the heating pan 24. A portion of the primary amount of the glass beads 26 in the heating pan 24 will enter the interior 34 of the base portion 30 and the interior 38 of the intermediate portion 36, because the bottom end 32 of the base portion 30 is open. The height of the primary amount of glass beads 26 the height of the base portion 30 and the intermediate portion 36, and the size of the receptacle portion 40 and the sizing of the notches 52,52 must be such that the frame 60 of the plastic frame spectacles 62 is elevated above the level of the primary amount of glass beads 26 (see line "X" in FIG. 5) in the heating pan 24, so that the frame 60 will not be heated by the primary amount of glass beads 26. The plastic frame spectacles 62 are then placed, in an upside-down orientation, onto the device 20, so as to be supported thereby. The bridge area 64 is held by the bridge receiving means 50 above the primary amount of glass beads 26, in supported contacting relation with a secondary amount of glass beads 27 that is introduced into the device 20 as follows. A secondary amount of glass beads 27 is removed from the heating pan 24 by a spoon or ladle (not shown) and is poured into the hollow interior 44 of the receptacle portion 40, around the bridge area 64 of the frame 60 of the plastic frame spectacles 62. The bridge area 64 experiences localized heating by the secondary amount of glass beads 27 in the interior 44 of the receptacle portion 40. Continuous heating is thus provided from the heating pan 24 through the glass beads that are in the hollow interior 34 of the base portion 30 and the hollow interior 38 of the intermediate portion 36. The remainder of the frame 60 of the plastic frame spectacles 62 remains relatively cool.

After the plastic frame spectacles 62 have been in place in the bridge receiving means 50 of the receptacle portion 40 for a period of time sufficient for the bridge area 64 to be pliable, the plastic frame spectacles 62 may be removed and bending of the bridge area 64 may be carried out by the optician.

In an alternative embodiment, it is contemplated that the base portion and, optionally, the intermediate portion are substantially solid instead of hollow, so as to not receive glass beads therein. With such an arrangement, the only glass beads to enter the interior of the receptacle portion would be the secondary amount of glass beads poured into the interior by the user.

It is to be understood that while certain forms of the present invention have been illustrated and described herein, it is not to be limited to the specific forms or arrangement of parts described and shown.

I claim:

1. A heating apparatus adapted to permit heating a plastic spectacle frame, said apparatus comprising, in combination:
    a heating pan within a plastic spectacle frame warmer retains a primary amount of particulate solid heat transfer medium therewithin;
    a support device comprising:
    a base portion adapted to maintain said device in substantially upright relation within said heating pan of said frame warmer;
    an intermediate portion supported by said base portion and extending substantially upwardly therefrom;
    a receptacle portion supported by said intermediate portion and extending substantially upwardly therefrom, and receiving and retaining a secondary amount of solid particulate heat transfer medium therein above the level of said primary amount of solid particulate heat transfer medium, so as to permit the transfer of heat from said heating pan through said primary amount of solid heat transfer medium to said secondary amount of solid heat transfer medium; and,
    a bridge receiving means associated with said receptacle portion and adapted to hold the bridge area of the plastic spectacle frame above said primary amount of solid particulate heat transfer medium in contacting heating relation with said secondary amount of solid heat transfer medium, so as to permit the transfer of heat from said secondary amount of solid heat transfer medium to said bridge area of the plastic spectacle frame.

2. The apparatus of claim 1, wherein said receptacle portion comprises a first peripheral wall retaining said secondary amount of solid particulate heat transfer medium.

3. The apparatus of claim 2, wherein said bridge receiving means comprises a pair of notches in said first peripheral wall, with said notches having a first end and a second end, with said first end being open at the top end of said first peripheral wall and said second end being within said first peripheral wall.

4. The apparatus of claim 3, wherein said notches are substantially vertically displaced.

5. The apparatus of claim 4, wherein said device is made from a single piece of material.

6. The apparatus of claim 5, wherein said intermediate portion comprises a second peripheral wall retaining a portion of said solid particulate heat transfer medium.

7. The apparatus of claim 6, wherein said first and second peripheral walls are contiguous one with the other.

8. The apparatus of claim 7, wherein said base portion comprises a third peripheral wall retaining a portion of said particulate material solid heat transfer medium.

9. The apparatus of claim 8, wherein said first, second and third peripheral walls are contiguous one with the other.

10. The apparatus of claim 9, wherein said device is made from a hollow tube of material.

11. The apparatus of claim 10, wherein said hollow tube is substantially circular in cross-section.

12. The apparatus of claim 11, wherein said device is about 3" high and about 1" in diameter.

13. The apparatus of claim 12, wherein said device is about 3" high and about 1½" in diameter.

14. The apparatus of claim 11, wherein said device is made of a plastic material.

15. The apparatus of claim 14, wherein said plastic material is phenolic plastic material.

16. The apparatus of claim 1, wherein said primary amount of heat transfer medium and said secondary amount of heat transfer medium comprises a solid granular material.

* * * * *